US006466274B1

(12) United States Patent
White

(10) Patent No.: US 6,466,274 B1
(45) Date of Patent: Oct. 15, 2002

(54) SYSTEM AND METHOD FOR COLOR PALETTE TRANSLATION

(75) Inventor: Brian K. White, Toluca Lake, CA (US)

(73) Assignee: Corporate Media Partners, Burbank, CA (US)

( * ) Notice: Subject to any disclaimer, the term of this patent is extended or adjusted under 35 U.S.C. 154(b) by 0 days.

(21) Appl. No.: 09/570,143

(22) Filed: May 12, 2000

Related U.S. Application Data

(60) Provisional application No. 60/163,930, filed on Nov. 8, 1999.

(51) Int. Cl.$^7$ .................................................. H04N 9/64

(52) U.S. Cl. ....................................... 348/649; 348/650

(58) Field of Search ......................... 348/453, 649–651, 348/708, 189; 382/162, 167; 358/150, 153, 186, 199

(56) References Cited

U.S. PATENT DOCUMENTS 5,502,458 A 3/1996 Braudaway et al. ........ 345/153

OTHER PUBLICATIONS

Preliminary Search Report dated Mar. 1, 2001, in PCT/US00/30756.

*Primary Examiner*—Victor R. Kostak
(74) *Attorney, Agent, or Firm*—Brown Raysman Millstein Felder & Steiner LLP

(57) ABSTRACT

The system and software of the present invention presents a process for translating a source palette containing TV unsafe colors into a resultant modified palette containing only TV safe colors, while preserving the color trends in the source palette. The software will first analyze a source color palette to determine the TV unsafe colors contained therein. For each TV unsafe color in the source color palette, the software determines the closest TV safe color by selecting a TV safe color that is the shortest Euclidean distance from the TV unsafe color. The TV unsafe colors are substituted with the calculated TV safe colors and stored in the resultant palette. The software will divide the color space of the source palette into discrete regions, e.g., by Hue (H), by selecting reference colors as the boundaries of the regions. The initially TV safe color will then be modified in a manner similar to the modifications made on nearby reference colors that were required to make them TV safe. The result will be a resultant palette comprised of only TV safe colors that maintains the color trends of the source palette when perceived by the human eye.

26 Claims, 11 Drawing Sheets

| Color | (R,G,B) |
|---|---|
| Black | (0,0,0) |
| Red | (1,0,0) |
| Green | (0,1,0) |
| Blue | (0,0,1) |
| Yellow | (1,1,0) |
| Magenta | (1,0,1) |
| Cyan | (0,1,1) |
| White | (1,1,1) |

| Color | (R,G,B) | I | Q | H (degrees) | C |
|---|---|---|---|---|---|
| Black | (0,0,0) | 0.000 | 0.000 | - | 0.000 |
| Red | (1,0,0) | 0.596 | 0.211 | 70.5 | 0.632 |
| Green | (0,1,0) | -0.274 | -0.523 | -152.3 | 0.590 |
| Blue | (0,0,1) | -0.322 | 0.312 | -45.9 | 0.448 |
| Yellow | (1,1,0) | 0.322 | -0.312 | 134.1 | 0.448 |
| Magenta | (1,0,1) | 0.274 | 0.523 | 27.7 | 0.590 |
| Cyan | (0,1,1) | -0.596 | -0.211 | -109.5 | 0.632 |
| White | (1,1,1) | 0.000 | 0.000 | - | 0.000 |

| Index | Red | Green | Blue |
|---|---|---|---|
| 00 | 0.0 | 0.0 | 0.0 |
| 01 | 0.0 | 0.0 | 0.5 |
| 02 | 0.0 | 0.0 | 1.0 |
| 03 | 0.0 | 0.5 | 0.0 |
| 04 | 0.0 | 0.5 | 0.5 |
| 05 | 0.0 | 0.5 | 1.0 |
| 06 | 0.0 | 1.0 | 0.0 |
| 07 | 0.0 | 1.0 | 0.5 |
| 08 | 0.0 | 1.0 | 1.0 |
| 09 | 0.5 | 0.0 | 0.0 |
| 10 | 0.5 | 0.0 | 0.5 |
| 11 | 0.5 | 0.0 | 1.0 |
| 12 | 0.5 | 0.5 | 0.0 |
| 13 | 0.5 | 0.5 | 0.5 |
| 14 | 0.5 | 0.5 | 1.0 |
| 15 | 0.5 | 1.0 | 0.0 |
| 16 | 0.5 | 1.0 | 0.5 |
| 17 | 0.5 | 1.0 | 1.0 |
| 18 | 1.0 | 0.0 | 0.0 |
| 19 | 1.0 | 0.0 | 0.5 |
| 20 | 1.0 | 0.0 | 1.0 |
| 21 | 1.0 | 0.5 | 0.0 |
| 22 | 1.0 | 0.5 | 0.5 |
| 23 | 1.0 | 0.5 | 1.0 |
| 24 | 1.0 | 1.0 | 0.0 |
| 25 | 1.0 | 1.0 | 0.5 |
| 26 | 1.0 | 1.0 | 1.0 |

Fig. 8

| COLOR INDEX | SOURCE R | G | B | CIE SYSTEM X | Y | Z | NTSC SYSTEM Y | I | Q | Cont... |
|---|---|---|---|---|---|---|---|---|---|---|
| 00 | 0.0 | 0.0 | 0.0 | 0.000 | 0.000 | 0.000 | 0.000 | 0.000 | 0.000 | Cont... |
| 01 | 0.0 | 0.0 | 0.5 | 0.101 | 0.057 | 0.559 | 0.057 | -0.161 | 0.156 | Cont... |
| 02 | 0.0 | 0.0 | 1.0 | 0.201 | 0.114 | 1.117 | 0.114 | -0.322 | 0.312 | Cont... |
| 03 | 0.0 | 0.5 | 0.0 | 0.087 | 0.294 | 0.033 | 0.294 | -0.137 | -0.262 | Cont... |
| 04 | 0.0 | 0.5 | 0.5 | 0.188 | 0.351 | 0.592 | 0.351 | -0.298 | -0.106 | Cont... |
| 05 | 0.0 | 0.5 | 1.0 | 0.288 | 0.408 | 1.150 | 0.408 | -0.459 | 0.051 | Cont... |
| 06 | 0.0 | 1.0 | 0.0 | 0.174 | 0.587 | 0.066 | 0.587 | -0.274 | -0.523 | Cont... |
| 07 | 0.0 | 1.0 | 0.5 | 0.275 | 0.644 | 0.625 | 0.644 | -0.435 | -0.367 | Cont... |
| 08 | 0.0 | 1.0 | 1.0 | 0.375 | 0.701 | 1.183 | 0.701 | -0.596 | -0.211 | Cont... |
| 09 | 0.5 | 0.0 | 0.0 | 0.304 | 0.150 | 0.000 | 0.150 | 0.298 | 0.106 | Cont... |
| 10 | 0.5 | 0.0 | 0.5 | 0.404 | 0.207 | 0.559 | 0.207 | 0.137 | 0.262 | Cont... |
| 11 | 0.5 | 0.0 | 1.0 | 0.505 | 0.264 | 1.117 | 0.264 | -0.024 | 0.418 | Cont... |
| 12 | 0.5 | 0.5 | 0.0 | 0.391 | 0.443 | 0.033 | 0.443 | 0.161 | -0.156 | Cont... |
| 13 | 0.5 | 0.5 | 0.5 | 0.491 | 0.500 | 0.592 | 0.500 | 0.000 | 0.000 | Cont... |
| 14 | 0.5 | 0.5 | 1.0 | 0.592 | 0.557 | 1.150 | 0.557 | -0.161 | 0.156 | Cont... |
| 15 | 0.5 | 1.0 | 0.0 | 0.478 | 0.737 | 0.066 | 0.737 | 0.024 | -0.418 | Cont... |
| 16 | 0.5 | 1.0 | 0.5 | 0.578 | 0.794 | 0.625 | 0.794 | -0.137 | -0.262 | Cont... |
| 17 | 0.5 | 1.0 | 1.0 | 0.679 | 0.851 | 1.183 | 0.851 | -0.298 | -0.106 | Cont... |
| 18 | 1.0 | 0.0 | 0.0 | 0.607 | 0.299 | 0.000 | 0.299 | 0.596 | 0.211 | Cont... |
| 19 | 1.0 | 0.0 | 0.5 | 0.708 | 0.356 | 0.559 | 0.356 | 0.435 | 0.367 | Cont... |
| 20 | 1.0 | 0.0 | 1.0 | 0.808 | 0.413 | 1.117 | 0.413 | 0.274 | 0.523 | Cont... |
| 21 | 1.0 | 0.5 | 0.0 | 0.694 | 0.593 | 0.033 | 0.593 | 0.459 | -0.051 | Cont... |
| 22 | 1.0 | 0.5 | 0.5 | 0.795 | 0.650 | 0.592 | 0.650 | 0.298 | 0.106 | Cont... |
| 23 | 1.0 | 0.5 | 1.0 | 0.895 | 0.707 | 1.150 | 0.707 | 0.137 | 0.262 | Cont... |
| 24 | 1.0 | 1.0 | 0.0 | 0.781 | 0.886 | 0.066 | 0.886 | 0.322 | -0.312 | Cont... |
| 25 | 1.0 | 1.0 | 0.5 | 0.882 | 0.943 | 0.625 | 0.943 | 0.161 | -0.156 | Cont... |
| 26 | 1.0 | 1.0 | 1.0 | 0.982 | 1.000 | 1.183 | 1.000 | 0.000 | 0.000 | Cont... |

| COLOR INDEX | H (deg.) | C | MODIFIED LAB L* | a* | b* | Y IRE | C IRE | E L | E H | TV UNSAFE? |
|---|---|---|---|---|---|---|---|---|---|---|
| 00 | - | 0.000 | 0.0 | 0.0 | 0.0 | 7.5 | 0.0 | 7.5 | 7.5 | |
| 01 | -46 | 0.224 | 28.7 | 41.5 | -78.8 | 12.8 | 40.8 | -7.6 | 33.2 | |
| 02 | -46 | 0.448 | 40.3 | 52.2 | -99.2 | 18.0 | 81.7 | -22.8 | 58.9 | x |
| 03 | -152 | 0.295 | 61.1 | -109.4 | 72.3 | 34.6 | 53.8 | 7.8 | 61.5 | |
| 04 | -109 | 0.316 | 65.8 | -64.6 | -17.7 | 39.9 | 57.6 | 11.1 | 68.7 | |
| 05 | -84 | 0.462 | 70.0 | -38.5 | -49.8 | 45.2 | 84.1 | 3.1 | 87.2 | |
| 06 | -152 | 0.590 | 81.2 | -137.8 | 91.0 | 61.8 | 107.5 | 8.0 | 115.6 | x |
| 07 | -130 | 0.569 | 84.2 | -104.9 | 11.1 | 67.1 | 103.7 | 15.2 | 118.9 | x |
| 08 | -109 | 0.632 | 87.1 | -81.4 | -22.3 | 72.3 | 115.2 | 14.8 | 129.9 | x |
| 09 | 71 | 0.316 | 45.6 | 72.7 | 106.1 | 21.3 | 57.6 | -7.5 | 50.1 | |
| 10 | 28 | 0.295 | 52.6 | 76.3 | -37.5 | 26.6 | 53.8 | -0.3 | 53.5 | |
| 11 | -3 | 0.418 | 58.4 | 79.9 | -68.0 | 31.9 | 76.2 | -6.2 | 70.0 | |
| 12 | 134 | 0.224 | 72.5 | -13.5 | 91.8 | 48.5 | 40.8 | 28.1 | 68.9 | |
| 13 | - | 0.000 | 76.1 | 0.0 | 0.0 | 53.8 | 0.0 | 53.8 | 53.8 | |
| 14 | -46 | 0.224 | 79.5 | 10.9 | -33.6 | 59.0 | 40.8 | 38.6 | 79.4 | |
| 15 | 177 | 0.418 | 88.8 | -58.4 | 104.2 | 75.6 | 76.2 | 37.5 | 113.7 | x |
| 16 | -152 | 0.295 | 91.4 | -43.9 | 23.5 | 80.9 | 53.8 | 54.0 | 107.8 | |
| 17 | -109 | 0.316 | 93.9 | -31.7 | -10.5 | 86.2 | 57.6 | 57.4 | 115.0 | x |
| 18 | 71 | 0.632 | 61.6 | 91.6 | 133.7 | 35.2 | 115.2 | -22.4 | 92.7 | x |
| 19 | 50 | 0.569 | 66.2 | 93.9 | -14.0 | 40.4 | 103.7 | -11.4 | 92.3 | |
| 20 | 28 | 0.590 | 70.4 | 96.2 | -47.3 | 45.7 | 107.5 | -8.1 | 99.5 | |
| 21 | 96 | 0.462 | 81.5 | 25.4 | 107.3 | 62.3 | 84.1 | 20.3 | 104.4 | |
| 22 | 71 | 0.316 | 84.5 | 32.9 | 14.5 | 67.6 | 57.6 | 38.8 | 96.4 | |
| 23 | 28 | 0.295 | 87.4 | 39.5 | -20.0 | 72.9 | 53.8 | 46.0 | 99.7 | |
| 24 | 134 | 0.448 | 95.5 | -17.0 | 115.7 | 89.5 | 81.7 | 48.6 | 130.3 | x |
| 25 | 134 | 0.224 | 97.8 | -8.0 | 34.5 | 94.7 | 40.8 | 74.3 | 115.1 | x |
| 26 | - | 0.000 | 100.0 | 0.0 | 0.0 | 100.0 | 0.0 | 100.0 | 100.0 | |

Fig. 9

| Index | TV Unsafe (R,G,B) | Closest TV Safe (R,G,B) |
|---|---|---|
| 02 | (0.000, 0.000, 1.000) | (0.008, 0.000, 0.922) |
| 06 | (0.000, 1.000, 0.000) | (0.000, 0.945, 0.000) |
| 07 | (0.000, 1.000, 0.500) | (0.000, 0.922, 0.443) |
| 08 | (0.000, 1.000, 1.000) | (0.000, 0.843, 0.812) |
| 15 | (0.500, 1.000, 0.000) | (0.482, 0.965, 0.000) |
| 17 | (0.500, 1.000, 1.000) | (0.478, 0.953, 0.953) |
| 18 | (1.000, 0.000, 0.000) | (0.918, 0.000, 0.000) |
| 24 | (1.000, 1.000, 0.000) | (0.824, 0.843, 0.000) |
| 25 | (1.000, 1.000, 0.500) | (0.953, 0.953, 0.478) |

Fig. 10

| COLOR INDEX | | R | G | B | Y | I | Q | ADJUSTMENT (PERCENT CHANGE) Y adj | I adj | Q adj |
|---|---|---|---|---|---|---|---|---|---|---|
| 02 | Source: | 0.000 | 0.000 | 1.000 | 0.114 | -0.322 | 0.312 | 0.942 = | 0.907 = | 0.927 = |
| | Translated: | 0.008 | 0.000 | 0.922 | 0.107 | -0.292 | 0.289 | -5.8% | -9.3% | -7.3% |
| 06 | Source: | 0.000 | 1.000 | 0.000 | 0.587 | -0.274 | -0.523 | 0.945 = | 0.945 = | 0.945 = |
| | Translated: | 0.000 | 0.945 | 0.000 | 0.555 | -0.259 | -0.494 | -5.5% | -5.5% | -5.5% |
| 07 | Source: | 0.000 | 1.000 | 0.500 | 0.644 | -0.435 | -0.367 | 0.918 = | 0.909 = | 0.937 = |
| | Translated: | 0.000 | 0.922 | 0.443 | 0.591 | -0.395 | -0.344 | -8.2% | -9.1% | -6.3% |
| 08 | Source: | 0.000 | 1.000 | 1.000 | 0.701 | -0.596 | -0.211 | 0.838 = | 0.826 = | 0.890 = |
| | Translated: | 0.000 | 0.843 | 0.812 | 0.587 | -0.492 | -0.188 | -16.2% | -17.4% | -11.0% |
| 15 | Source: | 0.500 | 1.000 | 0.000 | 0.737 | 0.024 | -0.418 | 0.965 = | 0.965 = | 0.965 = |
| | Translated: | 0.482 | 0.965 | 0.000 | 0.711 | 0.023 | -0.403 | -3.5% | -3.5% | -3.5% |
| 17 | Source: | 0.500 | 1.000 | 1.000 | 0.851 | -0.298 | -0.106 | 0.954 = | 0.949 = | 0.949 = |
| | Translated: | 0.478 | 0.953 | 0.953 | 0.811 | -0.283 | -0.100 | -4.6% | -5.1% | -5.1% |
| 18 | Source: | 1.000 | 0.000 | 0.000 | 0.299 | 0.596 | 0.211 | 0.918 = | 0.918 = | 0.918 = |
| | Translated: | 0.918 | 0.000 | 0.000 | 0.274 | 0.547 | 0.194 | -8.2% | -8.2% | -8.2% |
| 24 | Source: | 1.000 | 1.000 | 0.000 | 0.886 | 0.322 | -0.312 | 0.837 = | 0.807 = | 0.856 = |
| | Translated: | 0.824 | 0.843 | 0.000 | 0.741 | 0.260 | -0.267 | -16.3% | -19.3% | -14.4% |
| 25 | Source: | 1.000 | 1.000 | 0.500 | 0.943 | 0.161 | -0.156 | 0.953 = | 0.949 = | 0.949 = |
| | Translated: | 0.953 | 0.953 | 0.478 | 0.899 | 0.153 | -0.148 | -4.7% | -5.1% | -5.1% |

Figure 4: Regional Color Palette Translation Model case study color space regions

| Reference Color | Source Index | TV Safe (R,G,B) | $H_{source}$ (deg.) | $Y_{adj}$ | $I_{adj}$ | $Q_{adj}$ |
|---|---|---|---|---|---|---|
| Magenta | 20 | (1.000, 0.000, 1.000) | 28 | 1.000 | 1.000 | 1.000 |
| Red | 18 | (0.918, 0.000, 0.000) | 71 | 0.918 | 0.918 | 0.918 |
| Yellow | 24 | (0.824, 0.843, 0.000) | 134 | 0.837 | 0.807 | 0.856 |
| | 25 | (0.953, 0.953, 0.478) | 134 | 0.953 | 0.953 | 0.953 |
| Green | 06 | (0.000, 0.945, 0.000) | -152 | 0.945 | 0.945 | 0.945 |
| Cyan | 08 | (0.000, 0.843, 0.812) | -109 | 0.838 | 0.826 | 0.890 |
| | 17 | (0.478, 0.953, 0.953) | -109 | 0.953 | 0.953 | 0.953 |
| Blue | 02 | (0.008, 0.000, 0.922) | -46 | 0.942 | 0.907 | 0.927 |

| Region | Beginning Threshold Angle (degrees) | Ending Threshold Angle (degrees) |
|---|---|---|
| 1 | 28 | 71 |
| 2 | 71 | 134 |
| 3 | 134 | -152 |
| 4 | -152 | -109 |
| 5 | -109 | -46 |
| 6 | -46 | 28 |

| Index | Source Palette (R,G,B) | Translated Palette (R,G,B) |
|---|---|---|
| 00 | (0.000, 0.000, 0.000) | (0.000, 0.000, 0.000 |
| 01 | (0.000, 0.000, 0.500) | (0.004, 0.000, 0.463 |
| 02 | (0.000, 0.000, 1.000) | (0.008, 0.000, 0.922 |
| 03 | (0.000, 0.500, 0.000) | (0.000, 0.475, 0.000 |
| 04 | (0.000, 0.500, 0.500) | (0.000, 0.478, 0.478 |
| 05 | (0.000, 0.500, 1.000) | (0.004, 0.475, 0.941 |
| 06 | (0.000, 1.000, 0.000) | (0.000, 0.945, 0.000 |
| 07 | (0.000, 1.000, 0.500) | (0.000, 0.922, 0.443 |
| 08 | (0.000, 1.000, 1.000) | (0.000, 0.843, 0.812 |
| 09 | (0.500, 0.000, 0.000) | (0.459, 0.000, 0.000 |
| 10 | (0.500, 0.000, 0.500) | (0.502, 0.000, 0.502 |
| 11 | (0.500, 0.000, 1.000) | (0.490, 0.000, 0.973 |
| 12 | (0.500, 0.500, 0.000) | (0.478, 0.478, 0.000 |
| 13 | (0.500, 0.500, 0.500) | (0.490, 0.490, 0.490 |
| 14 | (0.500, 0.500, 1.000) | (0.475, 0.475, 0.933 |
| 15 | (0.500, 1.000, 0.000) | (0.482, 0.965, 0.000 |
| 16 | (0.500, 1.000, 0.500) | (0.475, 0.945, 0.475 |
| 17 | (0.500, 1.000, 1.000) | (0.478, 0.953, 0.953 |
| 18 | (1.000, 0.000, 0.000) | (0.918, 0.000, 0.000 |
| 19 | (1.000, 0.000, 0.500) | (0.957, 0.000, 0.482 |
| 20 | (1.000, 0.000, 1.000) | (1.000, 0.000, 1.000 |
| 21 | (1.000, 0.500, 0.000) | (0.933, 0.467, 0.000 |
| 22 | (1.000, 0.500, 0.500) | (0.918, 0.459, 0.463 |
| 23 | (1.000, 0.500, 1.000) | (1.000, 0.502, 1.000 |
| 24 | (1.000, 1.000, 0.000) | (0.824, 0.843, 0.000 |
| 25 | (1.000, 1.000, 0.500) | (0.953, 0.953, 0.478 |
| 26 | (1.000, 1.000, 1.000) | (0.978, 0.978, 0.978 |

SYSTEM AND METHOD FOR COLOR PALETTE TRANSLATION

Applicant hereby claims the benefit of provisional application no. 60/163,930, filed Nov. 8, 1999, which application is hereby incorporated by reference into this application in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates to color systems and, more particularly, to a method and system for transforming a color palette with TV unsafe colors into a palette that contains only TV safe colors in such a way that the initial and transformed color palettes are nearly identical when perceived by the human eye.

The range or gamut of colors that a television system can transmit and display is limited. Standards of the NTSC (National Television Systems Committee) system used throughout North America, and other television system standards, determine which colors are "safe" for transmission and display on a television set and which are "unsafe." This contrasts with the color gamut supported by computer systems such as personal computers, which typically support the use of a color gamut ranging from 256 colors to millions of distinct colors. Indeed, it is common for 25 percent or more of the colors in a typical computer system source palette (the selection of colors from which colors may be selected for images) to be TV unsafe, and many computer graphic images contain colors which cannot be supported in a television signal.

The convergence of computers and television makes it desirable to be able to display graphical color information created for a computer on a television. There are a variety of models and methods commonly used in the industry to assure the TV safeness of colors in computerized graphic images. One method is to simply avoid the use of TV unsafe colors altogether, which often has the effect of eliminating 25 percent or more of the colors in a source color palette. This limits the range of colors even when the image is available for viewing on a computer system. A second method in use is a model whereby TV unsafe colors in the source palette are forced to be TV safe while TV safe colors are unaltered. As a result, the color trends and interrelationships of the original palette are destroyed. A third model in use is one where all RGB values are scaled by a single factor to assure TV safeness. While this method has the benefit of maintaining the color trends of the source palette, they are maintained at the expense of over attenuating a significant amount of colors in the source palette.

The above approaches are simplistic solutions to the problems associated with graphic images and TV color safety. These approaches, however, generally fail to accomplish what should be intuitive goals of color palette translation, such as keeping the number of colors in the translated palette equal to the number of colors in the source palette, altering the colors in the source palette only as much as is required to make them TV safe, and maintaining the color trends of the source palette. There is thus a need for techniques more directed to achieving these goals. The techniques presented herein offer a method for translating color palettes for use in television systems that is superior to those that currently exist in the field of color transformation.

SUMMARY OF THE INVENTION

It is an object of the present invention to solve the problems described above with existing color translation systems.

It is another object of the present invention to transform a color palette with TV unsafe colors into a palette that contains only TV safe colors in such a way that the initial and transformed color palettes are nearly identical when perceived by the human eye.

It is another object of the present invention to perform such a color transformation while preserving the number of colors in the source palette for other applications.

It is another object of the present invention to perform such a transformation while maintaining the color trends of the initial palette.

The color palette translation model discussed herein, however, can be extended to any television system. Essentially, the model presented herein consists of four main steps:

(1) Determination of the TV unsafe colors in the source color palette;

(2) Replacement of the TV unsafe colors with optimal TV safe colors;

(3) Segmentation of color space into color regions;

(4) Modification of all other source palette colors based on operations performed on the TV unsafe colors in Step (2) and the color space regions defined in Step (3).

By applying this method to a color palette containing colors unfit for display on a television set, a palette is generated that contains only TV safe colors. Moreover, the resultant palette is created in such a way that the initial and transformed color palettes are nearly identical when perceived by the human eye.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 8 shows a table containing data and calculations used in determining the TV safeness of the colors in FIG. 6;

FIG. 9 shows an initial mapping of TV unsafe to TV safe colors;

FIG. 10 shows differences between the illegal colors in the source palette of FIG. 6 and the TV safe colors to which they are mapped;

DETAILED DESCRIPTION OF THE PREFERRED EMBODIMENTS

The system and method presented herein combine numerous aspects of color theory to translate a TV unsafe source color palette into a TV safe color palette that is nearly identical to the source palette as perceived by the human eye. In order to more fully understand how the system and method works, it is first necessary to present a discussion of the mathematics underlying the processes.

I. Color Systems

Generally, it has been found possible to represent color stimuli vectors by a three-dimensional spatial construct called a tristimulus space or a color space. Over the past century, several alternative color spaces have been developed.

Figures 1, 2:
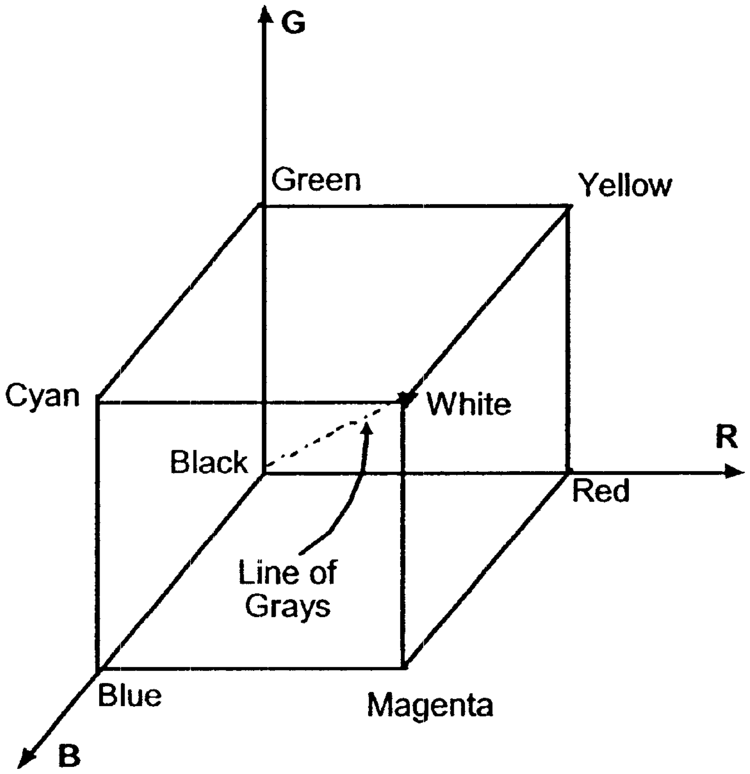
FIG. 1 shows a chart containing RGB values for common colors.
FIG. 2 shows a graphical representation of the RGB color space plotted along the R, G, and B axes.

In digital systems, a color can be uniquely specified by its respective levels of red, green and blue. For example, the red, green and blue, or RGB, components of white are 100%, 100% and 100%, respectively. In RGB notation, the color white may be specified as (R, G, B)=(1,1,1). The color blue, which has no red or green components, is specified as (R, G, B)=(0,0,1). FIG. 1 provides the RGB values of several common colors.

When RGB values are interpreted as a 3-dimensional vector, the gamut of realizable colors can be visualized as a cube in the RGB color space with the exemplary colors provided in FIG. 1 making up the 8 comers of the cube. FIG. 2 provides a plot of the exemplary colors in RGB space.

FIG. 2 provides the values of R, G and B in the range of 0 to 1. RGB values, however, are commonly listed with respect to the range used by the system they service. For example, in a 24-bit computer palette, the red, green and blue components are allocated 8-bits each. Because 8-bits correspond to $2^8$, or 256 levels, the 24-bit RGB component values are typically quoted using integers in the range 0 to 255. It is therefore common in a 24-bit RGB color palette to denote white as (R, G, B)=(255,255,255) and black as (0,0,0).

In 1931, the Commission on Illumination (CIE) introduced the XYZ color space. XYZ color values can be calculated from their respective RGB values as follows:

$$X=0.607R+0.174G+0.201B \quad (1)$$

$$Y=0.299R+0.587G+0.114B \quad (2)$$

$$Z=0.000R+0.066G+1.117B \quad (3)$$

The value Y is known as luminance, which is a measure of the amount of black-and-white in a color. The values X and Z, which are also linear transformations of the RGB value, combine with Y to form a convenient coordinate system for colorimetric calculations.

Commercial NTSC television broadcasting uses a third method, known as YIQ, for calculating color values. Historically, TV was introduced as a black-and-white system, after which it wag upgraded to include color transmission and display capabilities. Because the color component of the NTSC signal is carried upon the existing black-and-white signal by modulation, the YIQ space, which stores black-and-white and color information separately, is a convenient system for NTSC calculations. YIQ color space values can be derived from RGB values by applying the following calculations:

$$Y=0.299R+0.587G+0.114B \quad (4)$$

$$I=0.596R-0.274G-0.322B \quad (5)$$

$$Q=0.211R-0.523G-0.312B \quad (6)$$

The value Y is again luminance, while the values I and Q are known as the in-phase and quadrature components of the color, respectively. While Y is a measure of the black-and-white component of a color, the values I and Q store information about the actual color portion.

From the YIQ values, the hue (H) and the chrominance (C) of a color can be determined by the following equations:

$$H=\tan^{-1}(I/Q) \quad (7)$$

$$C=\sqrt{I^2+Q^2} \quad (8)$$

The hue value (H) relates to the wavelength of a color, while the chrominance value (C) is a measure of the richness or amount of color present. Hue and chrominance, which a functions of I and Q, convert the color information values of YIQ space into metrics that correspond to the way in which the human eye visually measures color.

Figures 3, 4:
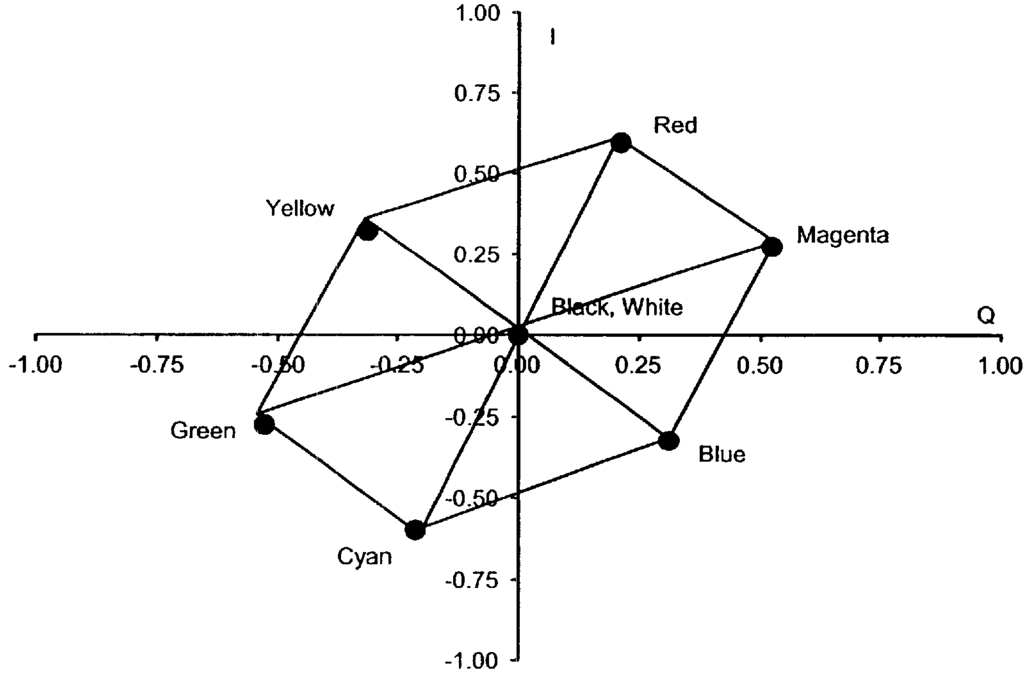
FIG. 3 shows the in-phase and quadrature values for common colors.
FIG. 4 shows a graphical representation of the in-phase and quadrature for common colors plotted along the in-phase and quadrature axes.

When color space is viewed in two dimensions using the in-phase (I) and quadrature (Q) values as the coordinate space axes, color trends are easily viewed. FIGS. 3 and 4 present a table and graph respectively containing common colors plotted on the IQ plane. In a rough geometric sense, the IQ plane is created by tipping the RGB cube presented in FIG. 2 on its end (so that it rests on its white comer and the line of grays points upward) and projecting the points in the resultant three dimensional lozenge onto the two dimensional plane below.

Through equations used to calculate H and C, any point in IQ color space also corresponds to a unique hue and chrominance value pair. The chrominance of a color is the Euclidean distance of the line from the origin to the IQ coordinate of the color in question while the hue is the angle that this line makes with the Q axis.

Trends of colors are easily seen in IQ space. With reference to FIG. 4, the color yellow, (R, G, B)=(1,1,0), is created by using equal parts of red and green with no blue component. As mentioned above, the line of luminance, which contains all shades of gray, including black and white, is an axis that points out of the page. For a given luminance, as one moves from the origin toward a given color, the I and Q values increase in the same proportion. This corresponds to an increase in chrominance , i.e., the addition of more and more of the given color to the initial shade of gray, and the geometric representation of this in color space is sometimes referred to herein as a spoke line. For a given chrominance, or distance from the origin, as one circles the origin, the magnitude of the value of I increases as Q decreases and vice versa. This corresponds to a move through the color spectrum, e.g., from red through yellow, green, cyan, blue, magenta and black to the original shade of red. Referring to FIG. 4 clarifies this explanation.

A final model used to represent color space is the Modified Lab color space model, also known as the luminance, red-green scale, yellow-blue scale model. Modified Lab color space values are calculated using the following equations:

$$L^* = 25\left(\frac{100Y}{Y_0}\right)^{1/3} - 16,\ 1 \le 100Y \le 100 \tag{9}$$

$$a^* = 500\left[\left(\frac{X}{X_0}\right)^{1/3} - \left(\frac{Y}{Y_0}\right)^{1/3}\right] \tag{10}$$

$$b^* = 200\left[\left(\frac{Y}{Y_0}\right)^{1/3} - \left(\frac{Z}{Z_0}\right)^{1/3}\right] \tag{11}$$

The value L* is a measure of brightness, while a* and b* are measures of red-green and yellow-blue content, respectively. The values $X_0$, $Y_0$ and $Z_0$ are known as the tristimulus values for reference white on the system under consideration. For the NTSC system:

$$X_0=0.982,\ Y_0=1.000,\ Z_0=1.183 \tag{12}$$

The Modified Lab color space, which gives a quantitative expression for the Munsell system of color classification, can be used to calculate color differences as perceived by the human eye.

The Euclidean distance between two colors in the Modified Lab color space is a good predictor of the human perception of the difference between two colors. Stated mathematically, the perceived visual difference, s, between two colors correlates to the following metric:

$$s=\sqrt{(\Delta L^*)^2+(\Delta a^*)^2+(\Delta b^*)^2} \tag{13}$$

If a color is determined to be unsafe for TV transmission, as described below, then the color in the Modified Lab color space that is closest to it, and also TV safe, is determined to be the optimal TV safe color with which it can be replaced.

II. Television Safe Transmission

The IRE unit, named for the Institute of Radio Engineers, is a measure for the level of a composite video signal. Video signal levels outside the range (−20,100) IRE can cause distortion in some consumer video equipment. Video signal levels outside the range (−40,120) IRE are considered illegal and should not be transmitted. As a rule of thumb, it is assumed that a signal in the range (−20,110) IRE is NTSC safe. Stated mathematically, a signal is considered safe for TV transmission if its lower (EL) and upper (EU) signal level excursions meet the following lower (TL) and upper (TU) threshold criteria:

$$\mathrm{Min}(E_L) \geqq T_L = -20\mathrm{IRE} \tag{14}$$

$$\mathrm{Max}(E_u) \leqq T_U = 110\mathrm{IRE} \tag{15}$$

Luminance, in terms of IRE, spans the range 7.5 IRE for pure black to 100 IRE for pure white, whereas luminance in an RGB system, as depicted in FIG. 2, spans the range 0.0 for pure black to 1.0 for pure white. The equation to convert the luminance (Y) of a RGB value to units of IRE is:

$$Y_{IRE}=92.5Y+7.5 \tag{16}$$

For RGB values in the range (0,255), the chrominance value is converted to units of IRE by dividing it by 1.4. Since this application uses RGB values in the range (0,1), the chrominance value must additionally be scaled by a factor of 255. That is:

$$C_{IRE} = \frac{255}{1.4}C = \frac{255}{1.4}\sqrt{I^2+Q^2} \tag{17}$$

The base signal level for TV transmission of the luminance portion of an RGB value is $Y_{IRE}$. The signal level modulates above and below the base signal level by $C_{IRE}/2$, or a total of $C_{IRE}$, as the color portion of the RGB value is transmitted. That is, the lower (EL) and upper (EU) excursions of the signal level during transmission of a color are:

$$E_L = Y_{IRE} - \frac{C_{IRE}}{2} \tag{18}$$

$$E_U = Y_{IRE} + \frac{C_{IRE}}{2} \tag{19}$$

Using (14), (15), (18) and (19), a RGB color is TV safe if:

$$E_L \geqq T_L \tag{20}$$

$$E_U \leqq T_U \tag{21}$$

III. Uniform Color Trend Modifications

In accordance with the invention, a methodology is described for translating a source palette containing TV unsafe colors into a TV safe palette which retains the color trends of the source palette. This methodology is implemented by a color translation software program or routine. The software program is stored in a memory device, such as a ROM, hard disk, CD-ROM, DVD, removable media, or any other type of magnetic or optical storage device. The program is loaded into a temporary or transient storage device such as a RAM or cache memory and executed on a processor in a computer system. Temporary storage, e.g., RAM memory, is utilized by the software to save intermediary data structures generated throughout the transformation process. The computer has input and output devices for the software to receive a source color palette and to transmit or output a resultant translated color palette. The resultant translated color palette is then used by the computer or another apparatus to convert specific graphic or video images from their colors derived from the source palette to the colors derived from the translated palette.

The process performed by the color translation software of translating a palette while preserving color trends in the modified color palette, described in greater detail below, can be summarized as follows:

Step 1: Determine the TV unsafe colors in the source palette in the manner described by equations (14) through (21) and the accompanying text.

Step 2: Find the closest TV safe color for each TV unsafe source color and substitute it in the manner described by equation (13) and the accompanying text.

Step 3: Divide color space into regions by hue (H) by selecting reference colors as the boundaries of the regions.

Step 4: Perform modifications on the initially TV safe colors similar to those made on nearby reference colors that were required to make them TV safe, as described below, e.g., by equations (22) through (24) below and the accompanying text.

Figure 7:
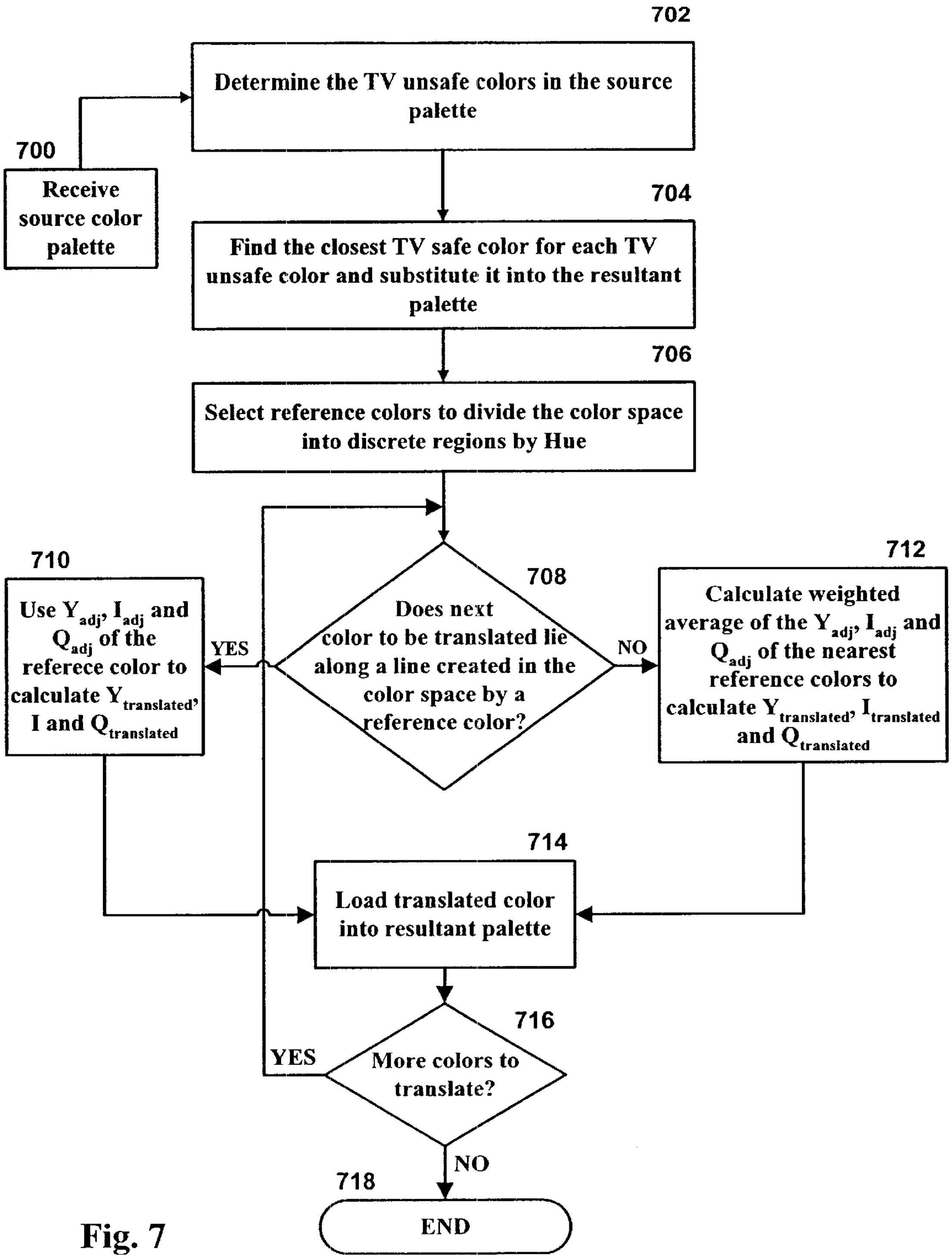
FIG. 7 shows a flowchart of an exemplary process of regional color transformation in accordance with one embodiment of the present invention.

FIG. 7 shows in greater detail a process performed by one embodiment of the color translation software. Prior to describing the process, the following explains the background and justification for the process.

If the only modification performed on a source color palette was to force all TV unsafe colors to be TV safe, using equations (13), (20), and (21), then the resulting palette would no longer appear uniform to the human eye with respect to the original color palette trends. The reason for the visual discrepancy is due to the fact that the human eye, which is very sensitive to color trends, would perceive that some colors were altered while others were not. The color trends of the source color palette can be preserved if colors in the source palette that were originally TV safe are modified in a manner consistent with the modifications done to the TV unsafe colors.

One solution for making the palette uniform, with respect to human perception of the original palette, would be to determine the color in the source palette that underwent the most extreme modification in order to become TV safe and apply the same modification to every color in the source palette. Although this method is mathematically acceptable, it is an extreme approach. A more elegant solution to the problem exists.

Suppose that the richest yellow in the source palette underwent an extreme modification to become TV safe. Reason dictates that, in order to unify the color trend in the yellows, all yellows in the palette should be altered in a similar manner, even if they were initially TV safe. If the richest green in the source palette only underwent a minor modification, however, rather than using the extreme modification made to the TV unsafe yellow, all greens in the palette should be altered in an manner similar to the TV unsafe green. Altering the initially TV safe greens in the same manner as the TV unsafe yellow is a more extreme modification than is necessary to maintain the color trend in the greens. Furthermore, if the richest magenta in the color palette did not require a modification to make it TV safe, then all magentas in the palette should remain unchanged.

Additionally, if two or more yellows in the color palette underwent modifications to become TV safe, it is preferable to determine which of the modifications was least extreme, and then perform that modification to the other TV safe yellows in the original color palette. Finally, for colors that lay between reference colors in a segmented color space, such as a color between red and yellow, modifications should be performed that are a weighted average of the modifications made to the nearest modified reference colors.

The term modification, as used above to signify the difference between a TV unsafe color and the TV safe color with which it is replaced, has a specific mathematical definition in the color palette translation model presented herein. The modification, or adjustment, made to the color is measured by assessing the factor that relates the Y, I and Q values of the initial TV unsafe color ($Y_{source}$, $I_{source}$ and $Q_{source}$) and the Y, I and Q values of the TV safe color with which it is replaced ($Y_{translated}$, $I_{translated}$ and $Q_{translated}$):

$$Y_{adj} = \frac{Y_{translated}}{Y_{source}} \tag{22}$$

$$I_{adj} = \frac{I_{translated}}{I_{source}} \tag{23}$$

$$Q_{adj} = \frac{Q_{translated}}{Q_{source}} \tag{24}$$

For example, if it is determined that the Y, I and Q values of the richest green in the source palette were each reduced by 5.5% to make it TV safe, i.e., $Y_{adj}=I_{adj}=Q_{adj}=0.945$, then a 5.5% reduction in the Y, I and Q values of all TV safe green in the source palette will be forced so the palette's green color trend can be maintained. In general, the RGB values for a color can be determined from its YIQ values by the following equations, which are derived from (4), (5) and (6):

$$R=1.000Y+0.956/+0.621Q \tag{25}$$

$$G=1.000Y-0.273/-0.647Q \tag{26}$$

$$B=1.000Y-1.103/+1.701Q \tag{27}$$

Altering the color palette in the manner just described has the result of forcing a TV safe palette, maintaining the color trends in the respective color regions of the original palette, and keeping each color in the palette very close to its source color in the original palette.

Figures 5, 6:
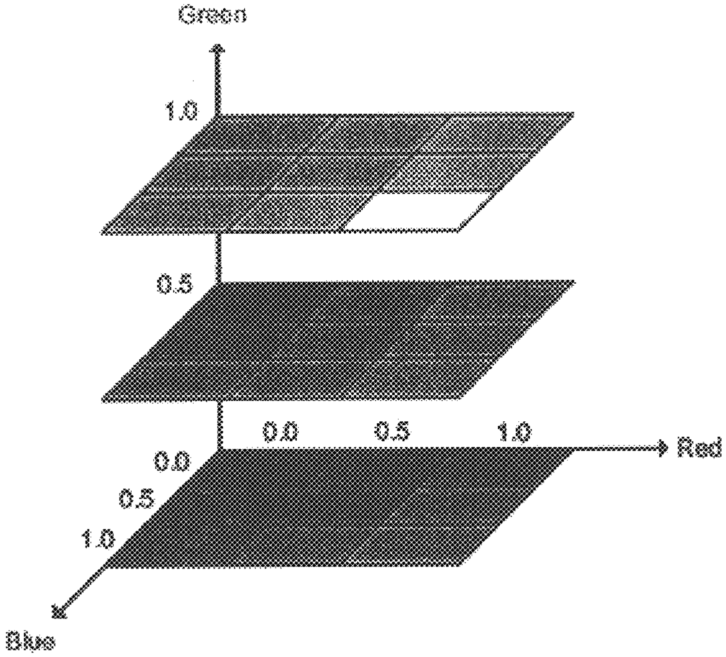
FIG. 5 shows a sample color palette containing 27 colors including all permutations of the RGB component values 0%, 50% and 100%.
FIG. 6 shows a table containing the RGB values representing the colors contained in FIG. 5.

This process can be better understood through use of an example. In the example, a source palette containing 27 colors is used, thereby creating a palette which includes all permutations of the RGB component values of 0%, 50% and 100%. This palette is depicted graphically in FIG. 5 and as a table in FIG. 6. It will be clear to those skilled in the art that the palette used herein is representative and is in no way to be considered limiting. Clearly, the method can readily be applied to a source palette containing any number of discrete colors.

Referring then to FIG. 7, the software receives a source color palette at step 700. The source palette may be a true color palette, i.e., a contiguous set of n colors, or may be generated by selecting the set of unique colors that comprise an image. Once the source palette is received, the software determines which colors are TV unsafe, step 702. In order to determine this, the equations and threshold checks outlined in the preceding text are applied to the source color palette. When these operations are applied to the sample color palette presented in FIGS. 5 and 6, the resultant table presented in FIG. 8 is generated.

Generally, the colors in the palette that are unsafe are those with relatively high luminance and high chrominance (e.g., yellow and cyan), or those with relatively low luminance and high chrominance (e.g., blue). Note that white, the brightest of all colors, and black, the darkest of all colors, are both legal. This is due to the face that black and white, being shades of gray, have 0 IRE chrominance. Examining the results generated by applying the equations to the source palette, it is determined that palette colors 02, 06, 07, 08, 15, 17, 18, 24 and 25 are TV unsafe (i.e., they lie outside the acceptable threshold IRE range of (−20, 100), as calculated by equations (14) and (15)). That is, 9 out of the 27 source palette colors, or 33%, are TV unsafe.

Following FIG. 7, in step 704 the program finds the TV safe colors that are closest to the TV unsafe colors in the source palette and replaces them. The pool of candidate replacement colors upon which this step is conducted depends on the color storage indexing supported by the systems under consideration.

Storing RGB data with a 24-bit scheme involves allocating 8-bits to the R component, 8-bits to the G component and 8-bits to the B component. The number of unique levels in an 8-bit number is $2^8=256$, which generally take the range of 0, 1, . . . , 255. Therefore, the number of unique colors in a 24-bit color palette is $(2^{24})=(2^8)(2^8)(2^8)=(256)(256)(256)=16{,}777{,}216$, or over 16 million. As a result, the pool of candidate colors that will be checked in step 704 consists of 16,777, 216 members. Stated mathematically, the RGB values in this candidate pool are $$(R_i, G_i, B_i) \in (R, G, B) = \left(\frac{r}{255}, \frac{g}{255}, \frac{b}{255}\right), \quad r, g, b = 0, 1, \ldots, 255,\ i = 0, 1, \ldots, 16777215 \tag{28}$$

Note that the division by 255 of the r, g, and b component values is performed in order to map them to the range (0,1), which is the convention being followed.

Using the closeness metric of equation (13) and the threshold checking scheme presented in equations (14) and (15) on the nine TV unsafe colors in the exemplary source palette results in the mapping presented in FIG. 9. The table presented in FIG. 10 includes important data associated with this mapping, such as the corresponding adjustments made to the Y, I and Q values of the colors.

Figures 11, 12, 13:
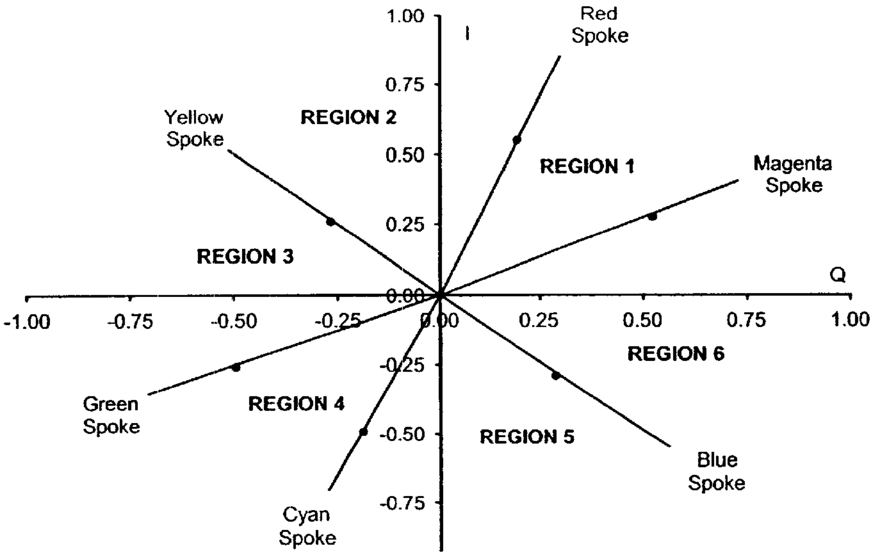
FIG. 11 shows the segmentation of YIQ color space along with reference colors.
FIG. 12 shows a table containing values of the reference colors used to segment the YIQ color space in FIG. 11.
FIG. 13 shows a table containing threshold angles used to separate the YIQ color space.

Again referring to FIG. 7, the third step 706 performed by the color translation program involves segmenting the color space into regions and defining the reference colors that will be used to set the color translation trends for the TV safe colors in the source palette. In the example presented, the color space will be divided into six regions and the reference colors will be 02, 06, 08, 18, 20 and 24 from the source palette, which are blue, green, cyan, red, magenta and yellow, respectively. These reference colors, which comprise six of the eight comers of the color cube presented in FIG. 4, are fairly evenly distributed throughout the color space and generally contain the most TV unsafe colors in the color space. The segmentation of color space and choice of reference color values for this example is depicted in FIG. 11. FIG. 12 contains additional information regarding the reference colors selected. Also, since all of the source palette colors with a hue (H) of 28 degrees were initially TV safe, the $V_{adj}$, $I_{adj}$ and $Q_{adj}$ values for the magenta spoke are listed as 1.0, 1.0 and 1.0, indicating that no colors along the magenta spoke need to be modified.

In accordance with the invention, any number and selection of reference colors may be used to achieve a desired result. The selection of very few reference colors, such as one or two, may result in the changes to the safe colors being too drastic. Selecting many reference colors, such as one hundred or more, may result in some discontinuities and choppiness of the color trends in the image. Better results are generally obtained by selecting reference colors representing substantially different hues, e.g., each reference color represents a color family or grouping (such as a reference color in green hues, a reference color in blue hues, etc.). This selection helps maintain consistency and color trends within the color family. In addition, the selection of reference colors may depend on the number of unsafe colors found in each hue or color family. A greater concentration of unsafe colors within a given color family may require more reference colors to be selected in that family for better results. One skilled in the art will determine proper selection of reference colors using these guidelines in light of desired results.

As recommended above, when there are two or more TV unsafe colors along a spoke in the segmentation of the color space, it is preferable to use the $Y_{adj}$, $I_{adj}$ and $Q_{adj}$ values that will result in the least extreme transitions to other colors in the region. In other words, referring to FIG. 12:

Using the $Y_{adj}$, $I_{adj}$ and $Q_{adj}$ for color 25 is preferable to those of color 24 for modifications needed to be made to colors in the yellow region.

Using the $Y_{adj}$, $I_{adj}$ and $Q_{adj}$ for color 17 is preferable to those of color 08 for modifications needed to be made to colors in the cyan region.

FIG. 13 contains a table listing the beginning and ending thresholds for the regions created by segmenting the color space.

Further referring to FIG. 7, in step 708 the program translates all of the initially TV safe source palette colors based on the modifications that have been made to the chosen reference colors. The reference colors do not undergo a modification in this step, but rather serve to set modification parameters for other palette colors. Source palette colors that underwent a modification to become TV safe, but are not reference colors, can either maintain their original TV safe translation values or be modified based on the reference color modification parameters.

The only colors that will be modified in this step are those which were initially TV safe and are additionally not reference colors. Of the 27 colors in the example source palette, nine underwent initial translation to become TV safe and will not be altered in this step. Color 20, magenta, being a reference color, will also not be modified in this step. Colors 00, 13, 26, which are black, gray and white, are located at the origin of the IQ space, and do not specifically reside in any of the six regions shown in FIG. 11. These three colors do not need to be modified but can be if so desired. This example will treat black, gray and white as having hues of 0 degrees and, therefore, residing in region 6. This choice will ultimately leave black unchanged but reduce the intensities of gray and white. Because white is often used as a background for text and because it has a luminance of 100 IRE, reducing the intensity of 100% white, although not required, is a good idea because it reduces the potential for distortion in video equipment.

As a result of the above reasoning, 17 of the source palette colors will be modified in this step. Referencing FIG. 8, 10 of these 17 colors reside on reference color spokes in the segments color space, i.e., have the same Hue as those reference colors, while 7 of these colors reside within the regions or ranges between reference color spokes.

Where a TV safe color to be translated lies on a spoke segmenting the color space, step 710, the program uses the adjustment values calculated in FIG. 12. For example, color 01 in the sample source palette is (R, G, B) (0.0, 0.0, 0.5) and has a hue of H=−46 degrees. This places color 01 on the blue spoke of the color space segmentation. Along the blue spoke, which contains reference color "Blue 02", the adjustment values of $Y_{adj}$=0.942, $I_{adj}$=0.907 and $Q_{adj}$=0.927. From FIG. 8, the source Y, I, and Q values for color 01 are Y=0.057, I=−0.161, and Q=0.156. By applying equations (22), (23) and (24), we find that the Y, I and Q values for the translated colors are:

$$Y_{translated}=Y_{adj}Y_{source}=(0.942)(0.057)=0.054$$

$$I_{translated}=I_{adj}I_{source}=(0.907)(-0.161)=-0.146$$

$$Q_{translated}=Q_{adj}Q_{source}=(0.927)(0.156)=0.145$$

Using equations (25), (26) and (27), it is concluded that:

$$\begin{aligned} R_{translated} &= 1.000Y_{translated} + 0.956I_{translated} + 0.621Q_{translated} \\ &= (1.000)(0.054) + (0.956)(-0.146) + (0.621)(0.145) \\ &= 0.004 \end{aligned}$$

$$\begin{aligned} G_{translated} &= 1.000Y_{translated} - 0.273I_{translated} - 0.647Q_{translated} \\ &= (1.000)(0.054) - (0.273)(-0.146) - (0.647)(0.145) \\ &= 0.000 \end{aligned}$$

$$\begin{aligned} B_{translated} &= 1.000Y_{translated} - 1.103I_{translated} + 1.701Q_{translated} \\ &= (1.000)(0.054) - (1.103)(-0.146) + (1.701)(0.145) \\ &= 0.463 \end{aligned}$$

That is, the program has transformed the source palette color (R, G, B)=(0.000, 0.000, 0.500) into the color (R, G, B)=(0.004, 0.000, 0.463).

Where a TV safe color to be translated lies within the region bounded by the spokes, step 712, the program uses $Y_{adj}$, $I_{adj}$ and $Q_{adj}$ values to translate the color which are a weighted average of the $Y_{adj}$, $I_{adj}$ and $Q_{adj}$ values of the nearest reference colors calculated in FIG. 12. For example, Color 21 in the source color palette is (R, G, B)=(1.0, 0.5, 0.0) and has a hue of 96 degrees. This places color 21 in Region 2 of the color space depicted in FIG. 11. The nearest reference colors in this case are "Red 18" and "Yellow 24" as shown in FIG. 12.

Color 21 is 25 degrees counterclockwise from the "Red 18" spoke at 71 degrees and 38 degrees clockwise from the "Yellow 24" spoke at 134 degrees. Therefore, the weighted average calculations for $Y_{adj}$, $I_{adj}$ and $Q_{adj}$, which will slightly favor the closer reference color (i.e., "Red 18") are:

$$\begin{aligned} Y_{adj} &= \left(\frac{38}{38+25}\right)Y_{adj(\text{"Red 18"})} + \left(\frac{25}{38+25}\right)Y_{adj(\text{"Yellow 24"})} \\ &= \left(\frac{38}{38+25}\right)(0.918) + \left(\frac{25}{38+25}\right)(0.953) \\ &= (0.603)(0.918) + (0.397)(0.953) \\ &= 0.932 \end{aligned}$$

$$\begin{aligned} I_{adj} &= \left(\frac{38}{38+25}\right)I_{adj(\text{"Red 18"})} + \left(\frac{25}{38+25}\right)I_{adj(\text{"Yellow 24"})} \\ &= \left(\frac{38}{38+25}\right)(0.918) + \left(\frac{25}{38+25}\right)(0.953) \\ &= (0.603)(0.918) + (0.397)(0.953) \\ &= 0.932 \end{aligned}$$

$$\begin{aligned} Q_{adj} &= \left(\frac{38}{38+25}\right)Q_{adj(\text{"Red 18"})} + \left(\frac{25}{38+25}\right)Q_{adj(\text{"Yellow 24"})} \\ &= \left(\frac{38}{38+25}\right)(0.918) + \left(\frac{25}{38+25}\right)(0.953) \\ &= (0.603)(0.918) + (0.397)(0.953) \\ &= 0.932 \end{aligned}$$

From FIG. 8, the source Y, I and Q values for color 21 are Y=0.593, I=0.459, and Q=−0.051. By applying equations (22), (23) and (24), the Y, I and Q values for the translated color are:

$Y_{translated}=Y_{adj}Y_{source}=(0.932)(0.593)=0.553$ $I_{translated}=I_{adj}I_{source}=(0.932)(0.459)=0.428$ $Q_{translated}=Q_{adj}Q_{source}=(0.932)(-0.051)=-0.048$ Applying claculations (25), (26) and (27), it is concluded that:

$$\begin{aligned} R_{translated} &= 1.000Y_{translated} + 0.956I_{translated} + 0.621Q_{translated} \\ &= (1.000)(0.553) + (0.956)(0.428) + (0.621)(-0.048) \\ &= 0.933 \end{aligned}$$

$$\begin{aligned} G_{translated} &= 1.000Y_{translated} - 0.273I_{translated} - 0.647Q_{translated} \\ &= (1.000)(0.553) - (0.273)(0.428) - (0.647)(-0.048) \\ &= 0.467 \end{aligned}$$

$$\begin{aligned} B_{translated} &= 1.000Y_{translated} - 1.103I_{translated} + 1.701Q_{translated} \\ &= (1.000)(0.553) - (1.103)(0.428) + (1.701)(-0.048) \\ &= 0.000 \end{aligned}$$

That is, the software has transformed the source palette color (R, G, B)=(1.000, 0.500, 0.000) into the color (R, G, B)=(0.933, 0.467, 0.000).

After a color has been translated, it is loaded into the resultant palette stored in temporary memory at step 714. The process is repeated for each color remaining to be translated in the source palette 716 until all colors have been translated and loaded into the resultant palette 718.

Figures 14, 15:
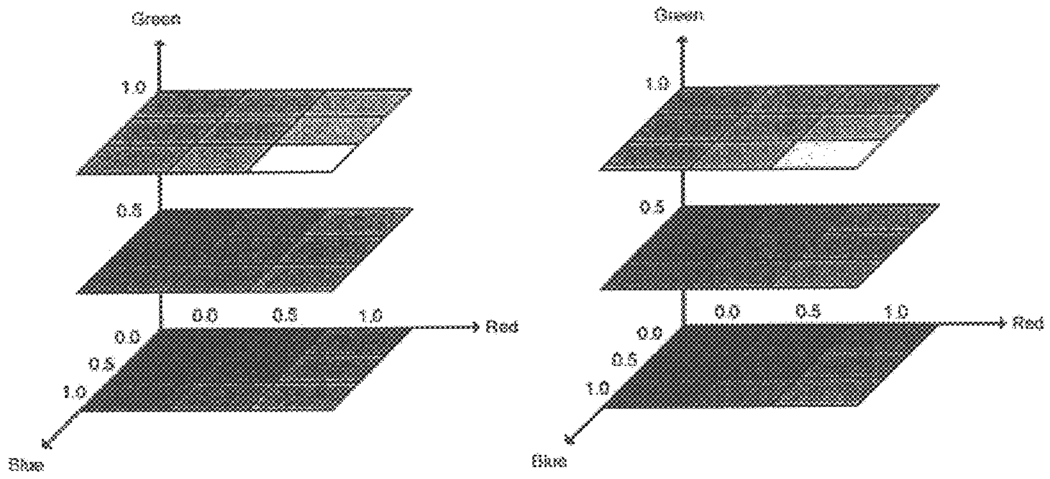
FIG. 14 shows a table containing values of the source and translated color palettes.
FIG. 15 shows a graphical representation of the source and translated color palettes plotted along red, green and blue axes.

After the software has applied the above techniques to the remaining TV safe colors in the color palette, the result will be the color mapping contained in FIG. 14 and graphically depicted in FIG. 15. This resultant palette maintains the color trends of the source palette but contains only TV safe colors.

Although there has been a sufficient amount of work done in color theory to understand and model the operation of the human eye, no mathematical model exists that can perfectly model this complex human organ. As a result, one skilled in the art will recognize that the human eye should be the final judge, and that it may be necessary to make minor adjustments to a small portion of the colors in the translated palette in order to achieve a more optimal palette with respect to human perception.

Figure 16:
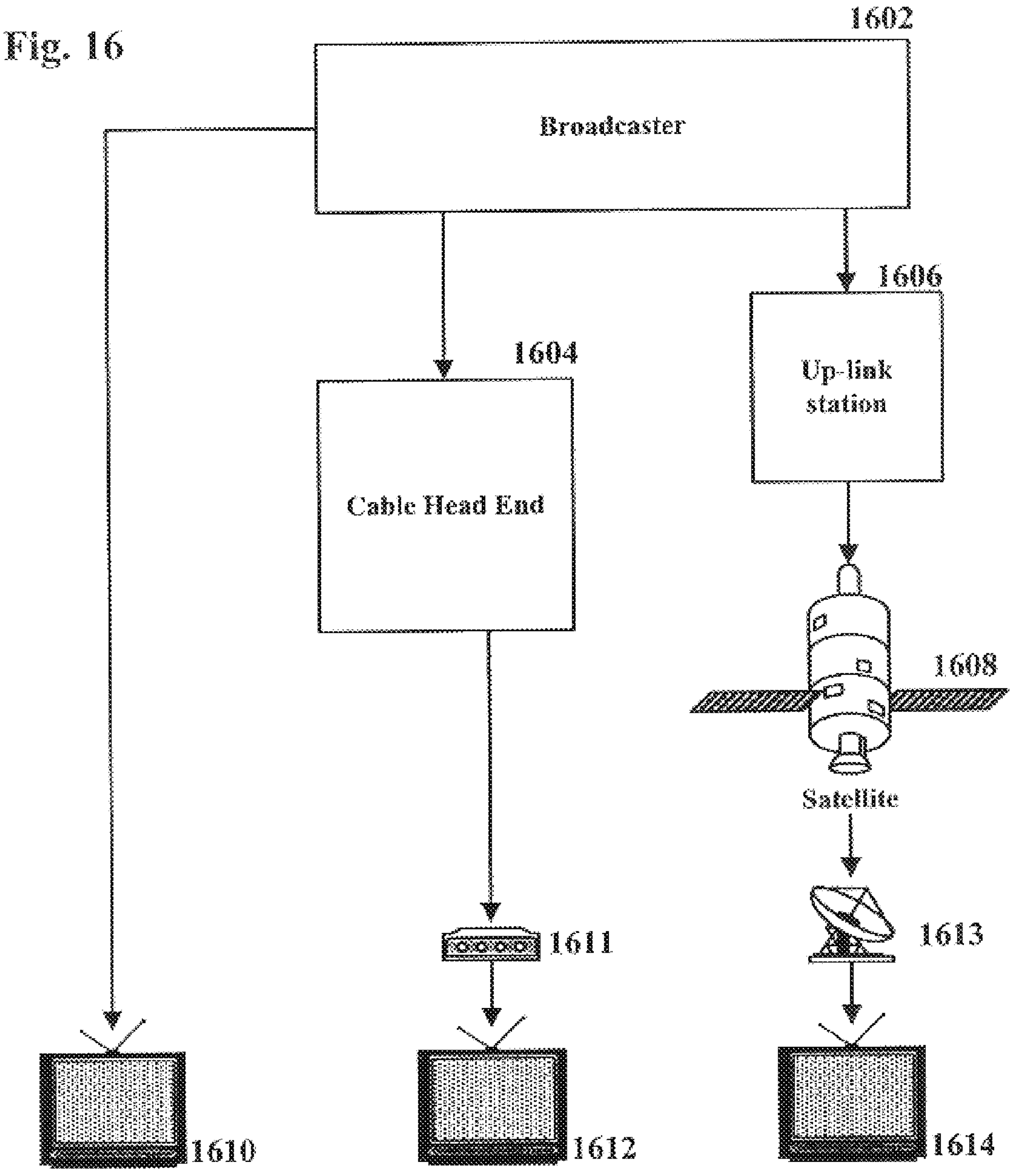
FIG. 16 shows several typical systems by which television signals are transmitted to viewers.
Figure 17:
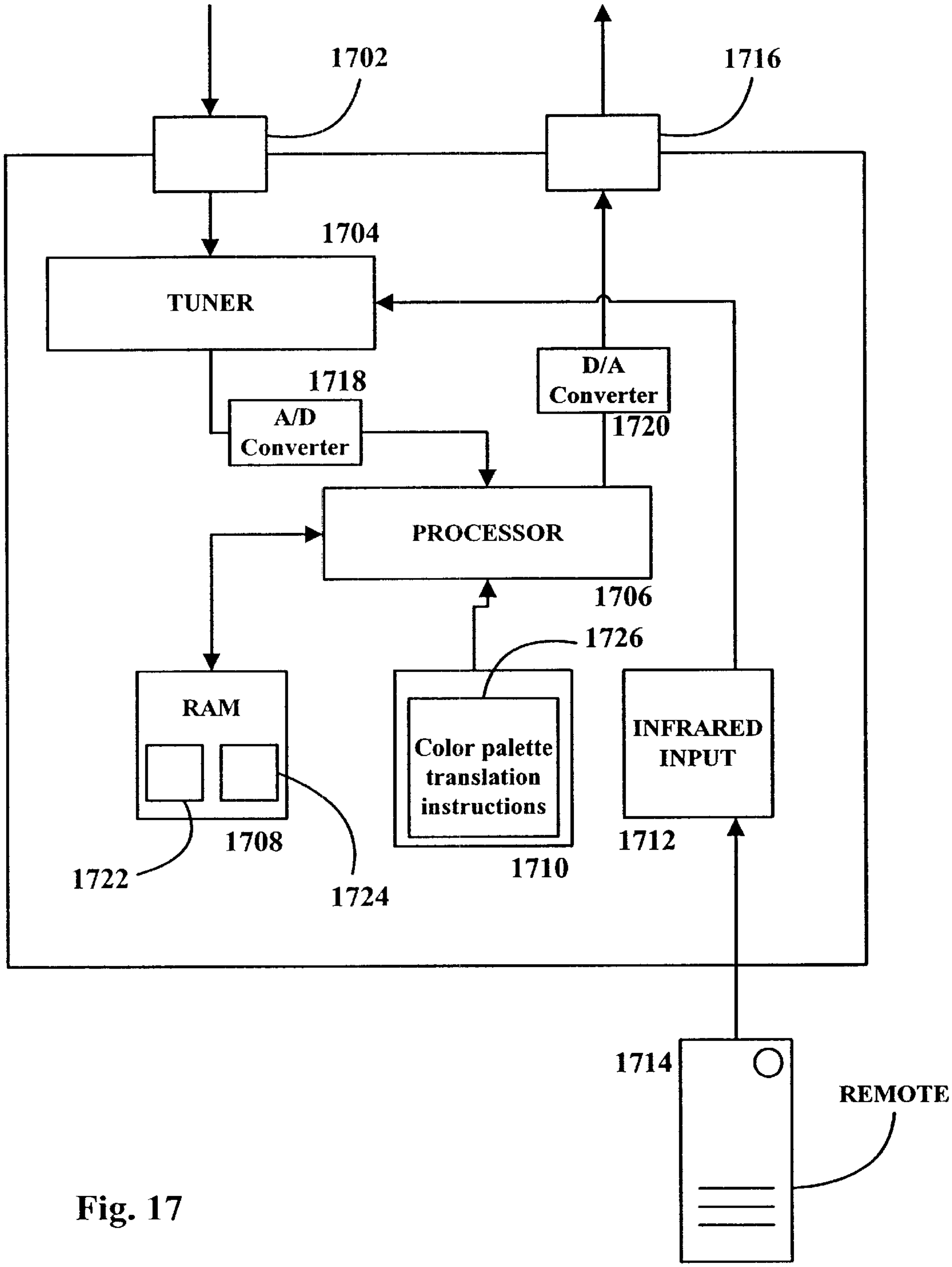
FIGS. 17 and 18 show block diagrams of an exemplary hardware assembly used to transform a signal containing TV unsafe colors to one that only contains TV safe colors in accordance with one embodiment of the present invention.
Figure 18:
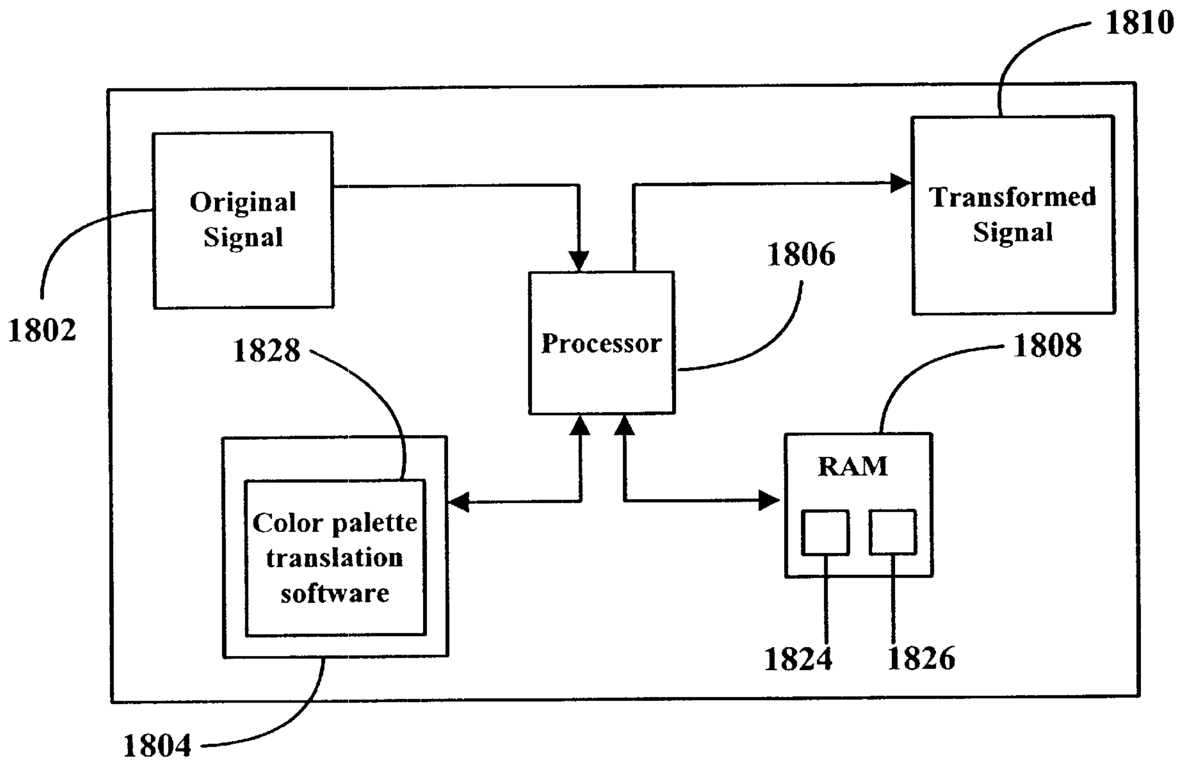

The software system described in the previous paragraphs may be executed by a variety of hardware devices. The devices may be used prior to transmission or broadcast of a video signal, such as might be preferable in an over-the-air broadcast environment, or may form part of a set top box or other receiver at a viewer's location. FIGS. 16–18 illustrate these alternatives.

FIG. 16 shows a broadcaster 1602 that distributes television signals via a variety of methods. In a cable television scenario, signals are first picked up by a cable head-end 1604 for transmission throughout the network to subscribers' set top boxes 1611 for display on receivers 1612. In a direct broadcast satellite scenario, signals are transmitted from an originating point (e.g., a broadcaster 1602) to terrestrial up-link station 1606 where the signal is sent to a satellite 1608 and then retransmitted back to earth where it is received by antennas 1613 for display on receivers 1614. TV viewers can also choose to receive transmissions via over-air broadcasts whereby an antenna is utilized to directly tune in broadcasts for viewing on a television set 1610.

Attention is now directed to FIG. 17, which shows an exemplary set-top box representing hardware that can be used to execute software to transform signals containing TV unsafe colors to a signal containing only TV safe colors. The set-top box generally includes an input connector 1702 electrically coupled to a tuner 1704. Tuner 1704 is connected to a processor 1706. Processor is further coupled to RAM 1708, ROM 1710 and an output connector 1716. In situations where the incoming signal is in analog form, the processor input is coupled to an A/D converter to first transform the signal to digital form. The processor output is further coupled to a D/A converter to convert the output signal to analog form for display on a conventional television. Additionally, a remote control 1714 sends signals to an infrared input 1712, coupled to the tuner 1714, to optionally control which frequency the tuner receives.

Incoming signals are received by the hardware via an input connector 1702 and passed to the tuner. When the tuner 1704 receives a signal, it is passed to the processor 1706 executing software 1726 for the transformation of color information. If the received signal is in analog form, an included A/D 1718 converter transforms the signal to digital form for further processing by the processor 1706. Where the incoming signal is already in digital form, the A/D converter 1718 may be bypassed with the signal travelling directly to the processor. Processor 1706 utilizes temporary storage space in RAM 1708 to execute software instructions 1726 stored in ROM 1710.

Two data structures are stored in RAM 1708: a source palette table 1722 and a translated palette table 1724. The color palette contained in the source signal is loaded into the source palette table 1722. Software 1726 executed by the processor 1706 first determines which colors in the source palette table 1722 are TV unsafe. The closest TV safe color for each TV unsafe color is calculated using the closeness metric of equation (13) and the threshold checking scheme presented in equations (14) and (15). The translated colors are then loaded into the translated palette table 1722. Reference colors are selected and the source palette table is then divided into discrete regions by Hue, along the reference colors.

Software 1726 instructs processor 1706 to determine whether the color to be translated lies along one of the lines created by the reference colors. If the color to be translated lies along one of the lines created by the reference colors, software 1726 first determines $Y_{translated}$, $I_{translated}$ and $Q_{translated}$ by applying calculations (22), (23) and (24). Software 1726 next instructs processor 1706 to determine $R_{translated}$, $G_{translated}$ and $B_{translated}$ by applying equations (25), (26) and (27). The colors are then loaded into the translated palette table 1724. If the color to be translated lies between the lines created by the reference colors, the software 1726 will use a weighted average of the $Y_{adj}$, $I_{adj}$ and $Q_{adj}$ values of the nearest reference colors to calculate $Y_{translated}$, $I_{translated}$ and $Q_{translated}$. Once translated, software 1726 will instruct processor 1706 to load the translated colors into the translated palette table 1724.

After the software 1726 has transformed the color palette, the resultant signal is passed through a D/A converter to transform the digital signal to analog form. The resultant TV safe analog signal is sent to a television set (not pictured) via the set-top box's output connector 1716.

Alternatively, all color processing can be completed at the originating point prior to transmission, thereby eliminating the need for a set-top box. As show by FIG. 18, an original signal containing TV unsafe colors is passed through a processor 1806. The processor utilizes RAM storage 1808 and executes software instructions 1828 contained in ROM 1804.

Two data structures are created in RAM 1808: a source palette table 1824 and a translated palette table 1826. The color palette contained in the source signal is loaded into the source palette table 1824. Software 1828 instructs processor 1806 to determine which colors in the source palette table 1824 are TV unsafe. The closest TV safe color for each TV unsafe color is calculated using the closeness metric of equation (13) and the threshold checking scheme presented in equations (14) and (15). The translated colors are then loaded into the translated palette table 1826. Reference colors are selected and the source palette table 1824 is divided into discrete regions by Hue, along the reference colors.

Software 1828 instructs processor 1806 to determine whether the color to be translated lies along one of the lines created by the reference colors. If the color to be translated lies along one of the lines created by the reference colors, software 1828 first determines $Y_{translated}$, $I_{translated}$ and $Q_{translated}$ by applying calculations (22), (23) and (24) and then determines $R_{translated}$, $G_{translated}$ and $B_{translated}$ by applying equations (25), (26) and (27). The colors are then loaded into the translated palette table 1826. If the color to be translated lies between the lines created by the reference colors, the software 1828 will use a weighted average of the $Y_{adj}$, $I_{adj}$ and $Q_{adj}$ values of the nearest reference colors to calculate $Y_{translated}$, $I_{translated}$ and $Q_{translated}$. Once translated, software 1828 instructs processor 1806 to load the translated colors into the translated palette table 1826, which table is used to generate modified video output signals 1810.

Where color translation is performed on the receiving end of a transmission, the transmission system uses a known color palette (which may have some unsafe colors) and all input signals use the known palette. The process described herein is performed in advance to generate a color translation table containing only safe colors. The receiving equipment stores the translation table for this and perhaps other known palettes, receives or determines the identity of the known palette, and performs a lookup and exchange of each color in the image received in accordance with the appropriate translation table. That is, for example, for each pixel in the received image using the known palette, if the pixel's color is (R,G,B), it is replaced with (R',G',B') which are the safe translations from the translation table.

As another option, all palette translation is performed prior to transmitting a signal, e.g., the translation table generated using the methods described herein is used to create a safe palette which is used during creation of the image. In this way all colors in the image are TV safe, color trends are maintained as described herein, and no additional processing is required.

It will thus be seen that the objects set forth above, among those made apparent from the preceding descriptions, are efficiently attained and, since certain changes may be made in the carrying out of the above process, in the described product and in the construction set forth without departing from the spirit and scope of the invention, it is intended that all matter contained in the above description and shown in the accompanying drawings shall be interpreted as illustrative and not in a limiting sense.

What is claimed is:

1. A method of converting a source palette containing television (TV) unsafe colors into a resultant palette containing TV safe colors, the method comprising:

adjusting a first color in the source palette, which first color is TV unsafe, to a TV safe color which is close to the first color;

selecting a plurality of color ranges within the source palette; and adjusting a second color in the source palette in an amount proportionate to the adjustment made to the first color and the second color's position within one of the color ranges, to thereby generate the resultant palette.

2. The method of claim 1, comprising determining which colors in the source palette are TV unsafe colors.

3. The method of claim 1 wherein the step of adjusting the first color to a close TV safe color comprises adjusting the first color to the TV safe color which is closest to the first color.

4. The method of claim 1, wherein the step of adjusting the first color to a TV safe color close to the first color comprises adjusting each TV unsafe color in the source palette to a close TV safe color.

5. The method of claim 1, wherein selecting color ranges comprises selecting color ranges having substantially different hues.

6. The method of claim 1, wherein selecting color ranges comprises selecting a plurality of reference colors and selecting color ranges as the ranges between adjacent reference colors.

7. The method of claim 6, wherein selecting reference colors comprises selecting reference colors in substantially different hues.

8. The method of claim 7, wherein selecting reference colors comprises selecting one or more colors from the group of hues consisting of blue, green, yellow, red, magenta, and cyan.

9. The method of claim 6, wherein selecting reference colors comprises selecting as a reference color for a given hue one of the TV unsafe colors in the given hue which was adjusted to a TV safe color by a less extreme transition than any other TV unsafe colors in the given hue.

10. The method of claim 8, wherein the step of adjusting the second color comprises adjusting the second color in the same proportion as the reference color if the second color has exactly the same hue as the reference color.

11. The method of claim 8 wherein the step of adjusting the second color further comprises adjusting the second color in proportion to a weighted average of the proportional changes made to the nearest reference colors to the second color, where the second color lies in a color range between the nearest reference colors.

12. An apparatus used to convert a source palette containing TV unsafe colors into a resultant palette containing TV safe colors, the apparatus comprising:

- a source palette table, stored in a first memory, to hold color palette information of the source palette;
- a translated palette table, stored in a second memory, to hold color palette information of the resultant palette;
- memory to hold program instructions used to cause the apparatus to perform a method for converting a source palette containing TV unsafe colors into a resultant palette containing TV safe colors, the method comprising:
  - adjusting a first color in the source palette, which first color is TV unsafe, to a TV safe color which is close to the first color;
  - selecting a plurality of color ranges within the source palette; and
  - adjusting a second color in the source palette in an amount proportionate to the adjustment made to the first color and the and the second color's position within one of the color ranges, to thereby generate the resultant palette.

13. The apparatus of claim 12, wherein the instructions further cause the apparatus to determine which colors in the source palette are TV unsafe colors.

14. The apparatus of claim 12, wherein the instructions for adjusting a first color to a close TV safe color comprise instructions for adjusting the first color to the TV safe color which is closest to the first color.

15. The apparatus of claim 12, wherein the instructions for adjusting a first color to a TV safe color close to the first color comprise instructions for adjusting each TV unsafe color in the source palette to a close TV safe color.

16. The apparatus of claim 15, wherein the instructions for adjusting each TV unsafe color to a close TV safe color comprise instructions for adjusting each TV unsafe color to the closest TV safe color.

17. The apparatus of claim 12, wherein the instructions for select color ranges comprise instructions for selecting color ranges having substantially different hues.

18. The apparatus of claim 12, wherein the instructions for selecting color ranges comprise instructions for selecting a plurality of reference colors and selecting color ranges as the ranges between adjacent reference colors.

19. The apparatus of claim 18, wherein the instructions for selecting reference colors comprise instructions for selecting reference colors in substantially different hues.

20. The apparatus of claim 19, wherein the instructions for selecting reference colors comprise instructions for selecting one or more colors from the group of hues consisting of blue, green, yellow, red, magenta, and cyan.

21. The apparatus of claim 18, wherein the instructions for selecting reference colors comprise instructions for selecting as a reference color for a given hue one of the TV unsafe colors in the given hue which was adjusted to a TV safe color by a less extreme transition than any other TV unsafe color in the given hue.

22. The apparatus of claim 19, wherein the instructions for adjusting a second color comprise instructions for adjusting the second color in the same proportion as the reference color if the second color has exactly the same hue as the reference color.

23. The apparatus of claim 19, wherein the instructions for adjusting the second color comprise instructions for adjusting the second color in proportion to a weighted average of the proportional changes made to the nearest reference colors to the second color, where the second color lies in a color range between the nearest reference colors.

24. An apparatus used to convert a source palette containing TV unsafe colors into a resultant palette containing only TV safe colors, the apparatus comprising:

- means for adjusting a first color in the source palette, which first color is TV unsafe, to a TV safe color which is close to the first color;
- means for selecting a plurality of color ranges within the source palette; and
- means for adjusting a second color in the source palette in an amount proportionate to the adjustment made to the first color and the second color's position within one of the color ranges, to thereby generate the resultant palette.

25. Computer readable media containing program code which, when executed on a computer, cause the computer to perform a method for converting a source palette containing TV unsafe colors into a resultant palette containing only TV safe colors, comprising:

- determining a TV unsafe color from the source palette;
- finding a close TV safe color for the TV unsafe color;
- selecting reference colors to divide the source palette into regions;
- adjusting a remaining color in proportion to the adjustment made to the TV unsafe color and based upon the closeness of the remaining color to one or more of the reference colors; and
- saving the translated colors in the resultant palette.

26. A method of converting a source palette containing television (TV) unsafe colors into a resultant palette containing TV safe colors, the method comprising:

- determining which colors in the source palette are TV unsafe colors;
- adjusting each TV unsafe color in the source palette to a TV safe color which is closest to the respective unsafe color;
- selecting a plurality of reference colors having substantially different hues from one another and dividing the source palette into color ranges based on the reference colors; and
- for each of a plurality of safe colors in the source palette, adjusting the safe color by:
  - if the safe color has exactly the same hue as a reference color, adjusting the safe color in the same proportion as any adjustment made to the reference color; and
  - if the safe color lies in a color range between two given reference colors, adjusting the safe color in proportion to a weighted average of the proportional adjustments made, if any, to the nearest reference colors to the safe color.

* * * * *